United States Patent
Fasano

(10) Patent No.: US 10,468,219 B2
(45) Date of Patent: Nov. 5, 2019

(54) CIRCUIT INTERRUPTER WITH STATUS INDICATION

(71) Applicant: Carling Technologies, Inc., Plainville, CT (US)

(72) Inventor: Michael Fasano, Watertown, CT (US)

(73) Assignee: Carling Technologies, Inc., Plainville, CT (US)

( * ) Notice: Subject to any disclaimer, the term of this patent is extended or adjusted under 35 U.S.C. 154(b) by 148 days.

(21) Appl. No.: 15/698,323

(22) Filed: Sep. 7, 2017

(65) Prior Publication Data

US 2019/0074153 A1   Mar. 7, 2019

(51) Int. Cl.

| | | |
|---|---|---|
| *H01H 73/12* | (2006.01) | |
| *H01H 71/04* | (2006.01) | |
| *H01H 71/46* | (2006.01) | |
| *H01H 71/50* | (2006.01) | |
| *H01H 73/14* | (2006.01) | |
| *H01H 23/02* | (2006.01) | |
| *H01H 9/02* | (2006.01) | |

(52) U.S. Cl.
CPC .......... *H01H 71/04* (2013.01); *H01H 23/025* (2013.01); *H01H 71/46* (2013.01); *H01H 71/50* (2013.01); *H01H 73/14* (2013.01); *H01H 2009/0292* (2013.01); *H01H 2071/042* (2013.01); *H01H 2071/046* (2013.01); *H01H 2300/03* (2013.01)

(58) Field of Classification Search
CPC .. H01H 3/22; H01H 9/02; H01H 9/04; H01H 13/04; H01R 9/26

USPC .......................................................... 335/17
See application file for complete search history.

(56) References Cited

U.S. PATENT DOCUMENTS

| | | | | |
|---|---|---|---|---|
| 1,834,550 A | * | 12/1931 | Reed ...................... | H01H 71/04 200/288 |
| 1,976,934 A | * | 10/1934 | Graves, Jr. ............ | H01H 71/04 200/308 |
| 2,723,326 A | * | 11/1955 | Bank ...................... | H01H 71/04 116/200 |
| 3,182,151 A | * | 5/1965 | Coughlin ................. | H01H 9/04 335/15 |
| 3,335,375 A | * | 8/1967 | Fujita ..................... | H01H 50/32 335/18 |
| 3,401,363 A | * | 9/1968 | Vyskocil ................ | H01H 71/04 335/10 |
| 3,443,258 A | * | 5/1969 | Dunham ................ | H01H 71/04 335/13 |

(Continued)

FOREIGN PATENT DOCUMENTS

| | | |
|---|---|---|
| DE | 102007047477 A1 | 4/2009 |
| EP | 0954002 A2 | 11/1999 |

(Continued)

*Primary Examiner* — Shawki S Ismail
*Assistant Examiner* — Lisa N Homza
(74) *Attorney, Agent, or Firm* — Forge IP, PLLC

(57) ABSTRACT

A circuit interrupter having a status indicator providing a current status of the circuit interrupter, the status indicator presenting one of: an On state, an Off state or a Fault state. The status indication is provided as a visual status and is color coded to one of the three circuit interrupter states. The circuit interrupter further including, in one configuration, a rocker actuator that rotates about an axis and the status indication mechanism is coupled to the rocker actuator.

17 Claims, 10 Drawing Sheets

(56) References Cited

U.S. PATENT DOCUMENTS

| | | | | |
|---|---|---|---|---|
| 3,596,218 A * | 7/1971 | Layton | H01H 71/04 | 200/308 |
| 3,596,219 A * | 7/1971 | Erickson | H01H 71/04 | 335/17 |
| 3,622,923 A * | 11/1971 | Shaffer | H01H 71/2472 | 335/17 |
| 3,683,350 A * | 8/1972 | Shedenheim | H01H 73/14 | 335/10 |
| 3,742,402 A * | 6/1973 | Nicol | H01H 71/465 | 335/13 |
| 3,970,975 A * | 7/1976 | Gryctko | H01H 71/04 | 335/18 |
| 3,973,230 A * | 8/1976 | Ciarcia | H01H 71/462 | 335/13 |
| 4,037,185 A * | 7/1977 | Klein | H01H 71/04 | 335/17 |
| 4,042,896 A * | 8/1977 | Powell | H01H 71/70 | 335/17 |
| 4,056,816 A * | 11/1977 | Guim | H01H 71/46 | 335/17 |
| 4,121,077 A * | 10/1978 | Mrenna | H01H 71/04 | 200/308 |
| 4,124,831 A * | 11/1978 | Kasahara | H01H 71/142 | 335/16 |
| 4,166,989 A * | 9/1979 | Castonguay | H01H 71/04 | 335/13 |
| 4,242,551 A * | 12/1980 | Sorenson | H01H 23/025 | 200/302.3 |
| 4,250,476 A * | 2/1981 | Evans | H01H 9/0066 | 200/308 |
| 4,301,342 A * | 11/1981 | Castonguay | H01H 71/04 | 200/308 |
| 4,301,433 A * | 11/1981 | Castonguay | H01H 71/46 | 335/13 |
| 4,308,511 A * | 12/1981 | Borona | H01H 89/06 | 307/38 |
| 4,347,488 A * | 8/1982 | Mune | H01H 71/1027 | 335/8 |
| 4,382,270 A * | 5/1983 | Davidson | H01H 71/04 | 335/17 |
| 4,417,222 A * | 11/1983 | Schmitt | H01H 1/2066 | 335/23 |
| 4,491,709 A * | 1/1985 | Chabot | H01H 3/3021 | 200/288 |
| 4,506,246 A * | 3/1985 | Wong | H01H 3/30 | 335/160 |
| 4,554,524 A * | 11/1985 | Radus | H01H 73/14 | 335/17 |
| 4,623,859 A * | 11/1986 | Erickson | H01H 3/38 | 335/14 |
| 4,623,861 A * | 11/1986 | Krasij | H01H 71/54 | 200/303 |
| 4,652,867 A * | 3/1987 | Masot | H01H 71/04 | 340/638 |
| 4,760,384 A * | 7/1988 | Vila-Masot | H01H 71/04 | 335/17 |
| 4,768,025 A * | 8/1988 | Vila-Masot | H01H 71/04 | 335/17 |
| 4,796,154 A | 1/1989 | Morris et al. | | |
| 4,801,906 A * | 1/1989 | Morris | H01H 71/465 | 335/13 |
| 4,900,275 A * | 2/1990 | Fasano | H02B 1/052 | 439/716 |
| 4,951,021 A * | 8/1990 | Theisen | H01H 71/1054 | 335/140 |
| 4,969,063 A | 11/1990 | Scott et al. | | |
| 5,003,139 A * | 3/1991 | Edds | H01H 71/0214 | 200/308 |
| 5,041,805 A * | 8/1991 | Ohishi | H01H 71/04 | 335/14 |
| 5,089,796 A * | 2/1992 | Glennon | H01H 83/22 | 335/172 |
| 5,095,293 A * | 3/1992 | Patel | H01H 1/0015 | 335/17 |
| 5,113,043 A * | 5/1992 | Morris | H01H 9/282 | 200/43.01 |
| 5,140,115 A * | 8/1992 | Morris | H01H 9/16 | 200/308 |
| 5,192,941 A * | 3/1993 | Fishovitz | H01H 71/46 | 335/17 |
| 5,223,681 A * | 6/1993 | Buehler | H01H 71/504 | 218/22 |
| 5,258,732 A * | 11/1993 | Marquardt | H01H 71/02 | 335/132 |
| 5,369,385 A * | 11/1994 | Schulte | H01H 73/52 | 335/167 |
| 5,424,701 A * | 6/1995 | Castonguay | H01H 3/30 | 200/400 |
| 5,453,724 A * | 9/1995 | Seymour | H01H 71/322 | 335/172 |
| 5,486,660 A * | 1/1996 | Fasano | H01H 71/1054 | 200/303 |
| 5,541,800 A * | 7/1996 | Misencik | H01H 73/14 | 335/18 |
| 5,607,047 A * | 3/1997 | Leet | H01H 11/0018 | 200/303 |
| 5,657,002 A * | 8/1997 | Ogden | H01H 85/30 | 335/14 |
| 5,701,110 A * | 12/1997 | Scheel | H01H 1/5805 | 335/132 |
| 5,714,940 A * | 2/1998 | Fishovitz | H01H 71/46 | 200/400 |
| 5,723,832 A * | 3/1998 | Hall | H01H 9/286 | 200/43.16 |
| 5,794,759 A * | 8/1998 | Butts | H01H 9/287 | 200/43.01 |
| 5,831,500 A * | 11/1998 | Turner | H01H 71/04 | 335/17 |
| 5,861,784 A * | 1/1999 | Heise | H01H 83/20 | 200/400 |
| 5,907,140 A * | 5/1999 | Smith | H01H 9/287 | 200/304 |
| 5,917,391 A * | 6/1999 | Mahaney | H01H 13/20 | 335/17 |
| 5,920,451 A * | 7/1999 | Fasano | H01H 73/14 | 335/18 |
| 5,923,261 A * | 7/1999 | Castonguay | H01H 71/465 | 200/400 |
| 5,936,535 A * | 8/1999 | Rosen | H01H 71/465 | 335/17 |
| 6,062,914 A * | 5/2000 | Fasano | H01H 71/08 | 361/634 |
| 6,104,265 A * | 8/2000 | Maloney | H01H 71/462 | 200/308 |
| 6,104,266 A * | 8/2000 | Tilghman | H01H 71/04 | 335/17 |
| 6,107,902 A * | 8/2000 | Zhang | H01H 71/04 | 200/308 |
| 6,130,390 A * | 10/2000 | Castonguay | H01H 71/04 | 200/308 |
| 6,140,897 A * | 10/2000 | Mueller | H01H 71/0228 | 200/43.01 |
| 6,144,271 A * | 11/2000 | Mueller | H01H 71/0228 | 335/167 |
| 6,222,433 B1 * | 4/2001 | Ramakrishnan | H01H 1/2058 | 200/308 |
| 6,246,304 B1 * | 6/2001 | Gasper | H01H 71/04 | 335/17 |
| 6,284,991 B1 * | 9/2001 | Fasano | H01H 71/0264 | 200/296 |
| 6,528,744 B2 * | 3/2003 | Bremner | H01H 3/20 | 200/334 |
| 6,600,396 B1 * | 7/2003 | Rodriguez | H01H 71/0228 | 335/132 |
| 6,803,535 B1 * | 10/2004 | Whipple | H01H 71/04 | 200/308 |
| 6,897,747 B2 * | 5/2005 | Brandon | H01H 71/524 | 335/17 |

(56) References Cited

U.S. PATENT DOCUMENTS

| | | | | |
|---|---|---|---|---|
| 7,034,644 B2* | 4/2006 | Moldovan | H01H 71/04 | 335/17 |
| 7,411,766 B1* | 8/2008 | Huang | H01H 71/04 | 335/13 |
| 7,488,913 B1* | 2/2009 | Durham | H02B 1/052 | 200/400 |
| 7,592,888 B2* | 9/2009 | Colsch | H01H 71/74 | 335/176 |
| 7,598,828 B1* | 10/2009 | Weeks | H01H 83/04 | 335/18 |
| 7,649,433 B2* | 1/2010 | Eley | H01H 71/04 | 200/308 |
| 8,766,749 B2* | 7/2014 | Ganley | H01H 71/125 | 335/172 |
| 8,836,453 B2* | 9/2014 | Yang | H01H 9/20 | 335/167 |
| 8,963,662 B2* | 2/2015 | Asokan | H01H 33/182 | 335/147 |
| 8,973,519 B2* | 3/2015 | Bindics | H01H 9/16 | 116/285 |
| 9,029,727 B2* | 5/2015 | Puhalla | H01H 33/20 | 218/148 |
| 9,230,757 B2* | 1/2016 | Rego | H01H 23/04 | |
| 9,966,210 B1* | 5/2018 | Fasano | H01H 33/42 | |
| 2002/0158724 A1* | 10/2002 | Wellner | H01H 71/02 | 335/16 |
| 2002/0158725 A1* | 10/2002 | Nerstrom | H01H 71/04 | 335/17 |
| 2002/0158726 A1* | 10/2002 | Wellner | H01H 71/04 | 335/18 |
| 2003/0038692 A1* | 2/2003 | Schmalz | H02H 1/06 | 335/35 |
| 2004/0051605 A1* | 3/2004 | Fasano | H01H 9/443 | 335/35 |
| 2004/0070474 A1* | 4/2004 | Wu | H01H 83/04 | 335/18 |
| 2004/0085167 A1* | 5/2004 | McCormick | H01H 71/46 | 335/16 |
| 2004/0145846 A1* | 7/2004 | Fasano | H01H 71/123 | 361/102 |
| 2004/0196123 A1* | 10/2004 | Simms | H01H 1/54 | 335/6 |
| 2005/0046525 A1* | 3/2005 | Tongo | H01H 73/14 | 335/17 |
| 2005/0046526 A1* | 3/2005 | Lipsey, II | H01H 73/14 | 335/17 |
| 2005/0140477 A1* | 6/2005 | Germain | H01H 83/04 | 335/18 |
| 2005/0212628 A1* | 9/2005 | Castonguay | H01H 89/08 | 335/20 |
| 2005/0212629 A1* | 9/2005 | Williams | H01H 89/08 | 335/20 |
| 2005/0258921 A1* | 11/2005 | Puskar | H01H 71/0228 | 335/17 |
| 2006/0071742 A1* | 4/2006 | Castonguay | H01H 89/08 | 335/20 |
| 2006/0125583 A1* | 6/2006 | Mills | H01H 71/123 | 335/172 |
| 2006/0202785 A1* | 9/2006 | Whipple | H01H 71/04 | 335/17 |
| 2007/0085638 A1* | 4/2007 | Zindler | H01H 71/04 | 335/132 |
| 2007/0132530 A1* | 6/2007 | Wang | H01H 83/04 | 335/6 |
| 2007/0188276 A1* | 8/2007 | Shi | H01H 83/04 | 335/6 |
| 2007/0194869 A1* | 8/2007 | Titus | H01H 71/04 | 335/172 |
| 2007/0200652 A1* | 8/2007 | Gibson | H01H 71/04 | 335/17 |
| 2007/0229202 A1* | 10/2007 | Gao | H01H 9/161 | 335/18 |
| 2008/0012664 A1* | 1/2008 | DeBoer | H01H 51/2209 | 335/14 |
| 2008/0042787 A1* | 2/2008 | McCoy | H01H 71/04 | 335/186 |
| 2008/0247100 A1* | 10/2008 | Fasano | H01H 83/02 | 361/45 |
| 2009/0256660 A1* | 10/2009 | Babu | H01H 71/04 | 335/17 |
| 2010/0026426 A1* | 2/2010 | Mortun | H01H 73/44 | 335/18 |
| 2010/0073113 A1* | 3/2010 | Yang | H01H 71/123 | 335/15 |
| 2010/0226053 A1* | 9/2010 | Kamor | H01H 83/04 | 361/42 |
| 2011/0141633 A1* | 6/2011 | Fasano | H01H 83/02 | 361/42 |
| 2012/0037598 A1* | 2/2012 | Fasano | H01H 9/36 | 218/22 |
| 2012/0085627 A1* | 4/2012 | Yang | H01H 71/46 | 200/43.16 |
| 2012/0168295 A1* | 7/2012 | Lin | H01H 73/52 | 200/560 |
| 2012/0262255 A1* | 10/2012 | Fasano | H01H 71/2409 | 335/7 |
| 2013/0088310 A1* | 4/2013 | Yang | H01H 9/20 | 335/14 |
| 2013/0180956 A1* | 7/2013 | Fasano | H01H 33/20 | 218/148 |
| 2013/0241677 A1* | 9/2013 | Padro | H01H 83/144 | 335/18 |
| 2013/0241678 A1* | 9/2013 | Bonasia | H01H 83/04 | 335/18 |
| 2013/0278361 A1* | 10/2013 | Weeks | H05K 5/02 | 335/6 |
| 2014/0062623 A1* | 3/2014 | Fasano | H01H 71/2463 | 335/16 |
| 2014/0076700 A1* | 3/2014 | Lin | H01H 9/48 | 200/304 |
| 2014/0083828 A1* | 3/2014 | Maloney | H01H 11/00 | 200/304 |
| 2014/0139302 A1* | 5/2014 | Rubbo | H01H 71/04 | 335/17 |
| 2014/0251959 A1* | 9/2014 | Fasano | H01H 9/30 | 218/155 |
| 2014/0305779 A1 | 10/2014 | Mezzo | | |
| 2015/0070114 A1* | 3/2015 | Fasano | H01H 71/32 | 335/21 |
| 2015/0200533 A1* | 7/2015 | Simonin | H02H 3/05 | 335/17 |
| 2016/0049263 A1* | 2/2016 | Maloney | H01H 3/04 | 335/21 |
| 2016/0049274 A1* | 2/2016 | Maloney | H01H 71/025 | 335/21 |
| 2016/0135313 A1* | 5/2016 | Freeman | H01H 3/02 | |
| 2016/0163488 A1* | 6/2016 | Maloney | H01H 71/2472 | 335/15 |
| 2016/0379789 A1* | 12/2016 | Fasano | H01H 71/40 | 335/18 |
| 2017/0032905 A1* | 2/2017 | Fasano | H01H 9/26 | |
| 2017/0047185 A1* | 2/2017 | Fasano | H01H 71/08 | |
| 2017/0103861 A1* | 4/2017 | Reid | H01H 9/02 | |
| 2018/0123326 A1* | 5/2018 | Luoma | H02B 1/26 | |
| 2018/0130616 A1* | 5/2018 | Fasano | H01H 73/12 | |
| 2018/0218864 A1* | 8/2018 | Fasano | H01H 50/041 | |
| 2019/0019636 A1* | 1/2019 | Maloney | H01H 9/02 | |
| 2019/0074153 A1* | 3/2019 | Fasano | H01H 71/04 | |

FOREIGN PATENT DOCUMENTS

| | | |
|---|---|---|
| EP | 1643529 A2 | 4/2006 |
| FR | 2901912 A1 | 12/2007 |

* cited by examiner

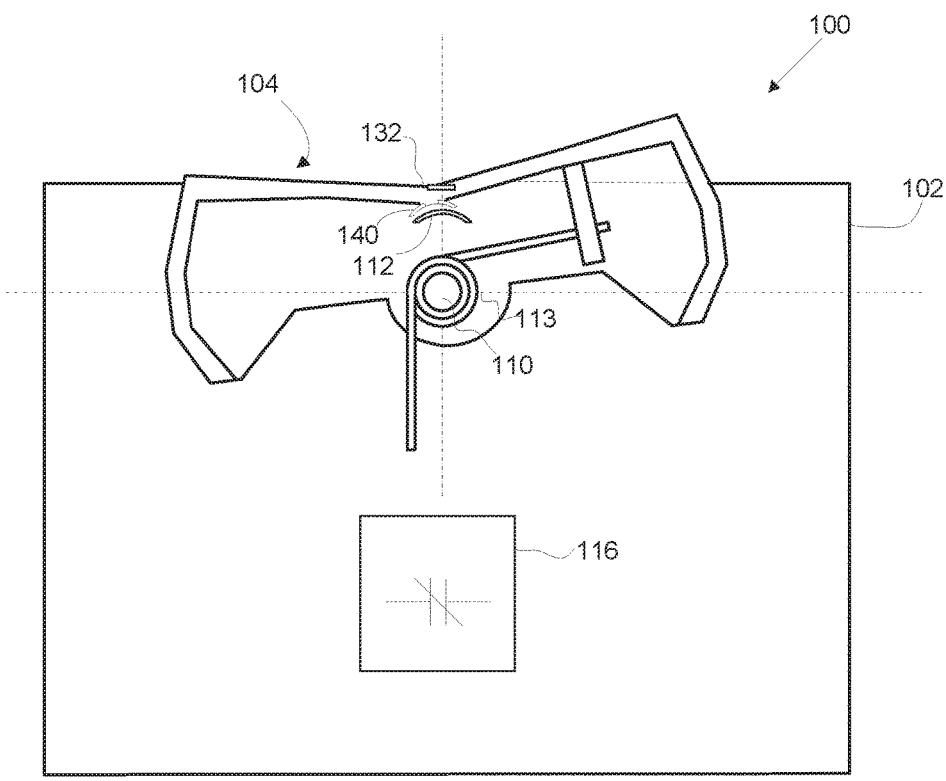
*FIG. 7A*
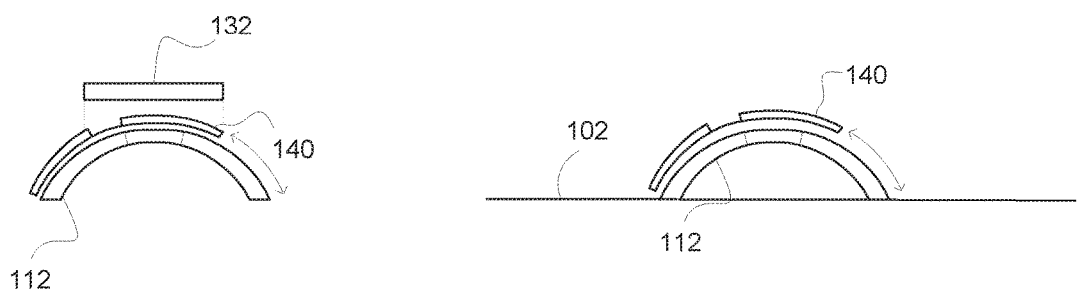
*FIG. 7B*  *FIG. 7C*

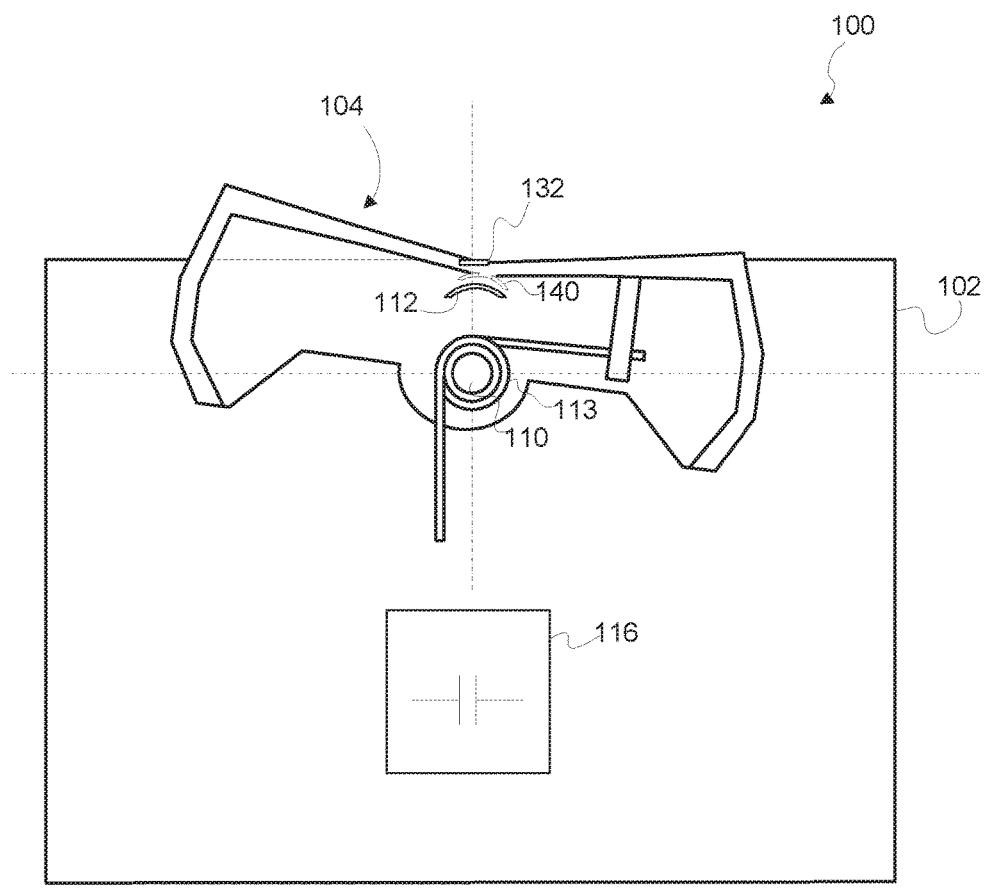
FIG. 8A
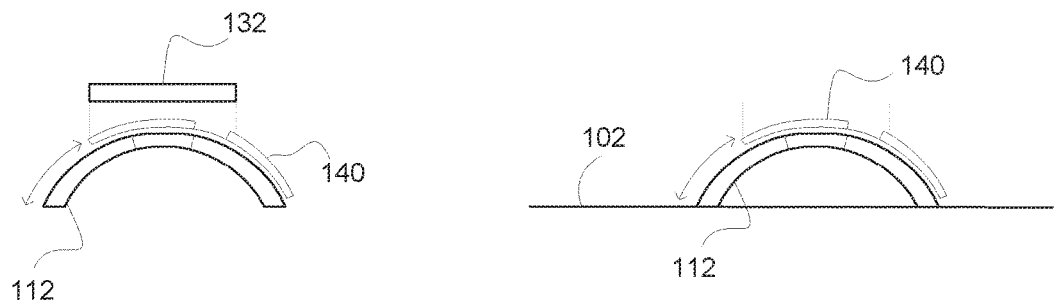
FIG. 8B  FIG. 8C

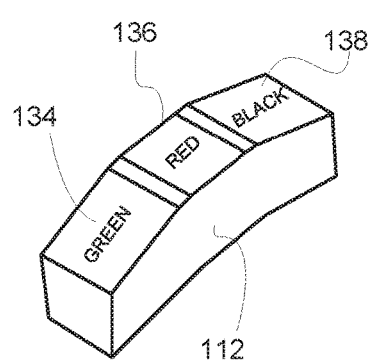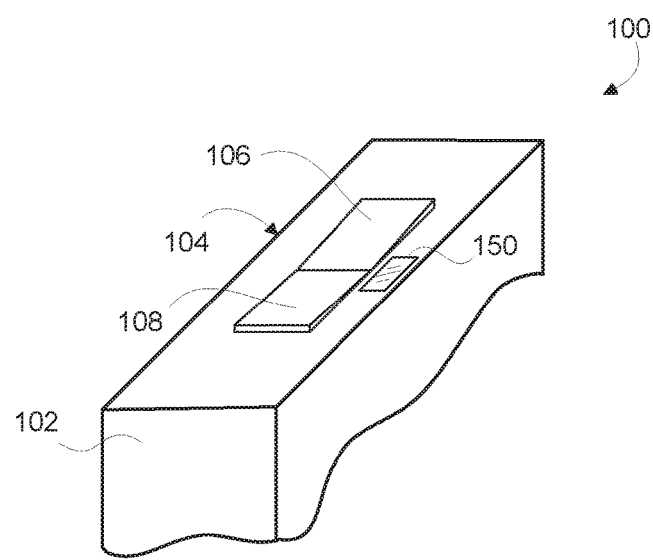
FIG. 11                    FIG. 12

CIRCUIT INTERRUPTER WITH STATUS INDICATION

FIELD OF THE INVENTION

The invention is directed toward a circuit interrupter, and more particularly, to a circuit breaker that provides a visual indication to allow for easy visual detection of the state of the circuit interrupter.

BACKGROUND OF THE INVENTION

Circuit interrupters are electrical components that can be used to break (or open) an electrical circuit, interrupting the current flow. A basic example of a circuit interrupter is a switch, which generally consists of two electrical contacts in one of two states; either closed, meaning that the contacts are touching and electricity can flow between them, or open, meaning that the contacts are separated, and no electricity can flow between them.

Another example of a circuit interrupter is a circuit breaker. A circuit breaker may be used, for example, in an electrical panel to limit the electrical current being sent through connected electrical wiring. A circuit breaker is designed to protect an electrical wiring and associated electrical components from damage caused by an overcurrent condition such as, a short circuit or a ground fault (collectively referred to as a fault condition). If a fault condition such occurs in the electrical circuit, the breaker will trip. This will cause a breaker that was in the "on" position to flip to the "off" position and interrupt the flow of electrical energy through the circuit breaker. When a circuit breaker is tripped, it may prevent a fire from starting on an overloaded circuit; it can also prevent damage to or the destruction of any devices that are drawing electricity from electrical circuit.

A standard circuit breaker has a terminal connected to a power supply, which may comprise electrical power provided by a power company. A standard circuit breaker also typically includes another terminal to which the electrical circuit is connected that the circuit breaker is intended to protect. Conventionally, these terminals are referred to as the "line" and "load" terminals respectively. The line is often referred to as the input into the circuit breaker; whereas the load is often referred to as the output. The output supplies electrical energy to the electrical components connected to the electrical circuit.

A circuit breaker may be used to protect an individual device, or a number of devices. For example, an individual protected device, such as a single air conditioner, may be directly connected to a circuit breaker. A circuit breaker may also be used to protect multiple devices by connecting to multiple components through wiring that terminates at electrical outlets. In this manner, the circuit breaker feeds electrical power to all the devices connected to the circuit via the outlets (e.g., a lamp, a television, a computer, etc.). In other configurations, circuit breakers may be for special use, for example, they may be provided in a rack in a server room where a certain number of servers are connected to a particular circuit breaker.

A circuit breaker can be used as a replacement for a fuse. Unlike a fuse however, which operates once and then must be replaced, a circuit breaker can be reset (either manually or automatically) to resume normal operation. Circuit breakers are generally considered safer to use than fuses. For example, in a situation where a fuse blows, interrupting power to a section of a building for example, it may not be apparent which fuse controls the interrupted circuit. In this case, all of the fuses in the electrical panel would need to be inspected to determine which fuse appears burned or spent. This fuse would then need to be removed from the fuse box, and a new fuse would need to be installed.

In this respect, circuit breakers can be much simpler to use than fuses. In a situation where a circuit breaker trips, interrupting power to a section of a building, for example, it may be easily apparent which circuit breaker controls the interrupted circuit by looking at the electrical panel and noting which breaker has tripped to the "off" position. Conventional circuit breakers include a switch on the face of the breaker where the switch is moved to the center of the electrical panel for "on", toward the perimeter of the electrical panel for "off" and will reside in a center position for "fault." This breaker can then be visually identified and reset. If the circuit breaker is in a fault state, the handle needs to be moved to the "off" state and then to the "on" state and power will be supplied to the connected electrical circuit.

In general, a typical circuit interrupter has two contacts located inside of a housing. The first contact is stationary, and may be connected to either the line or the load. The second contact is movable with respect to the first contact, such that when the circuit breaker is in the "off" or tripped position, a gap exists between the first and second contact.

U.S. Pat. No. 3,443,258 (the '258 patent") entitled Circuit Breaker With Trip Indicator provides a circuit breaker with a window that has a flag painted in a red color, such that, when the circuit breaker transitions into a tripped or fault condition, the red flag will be shown in the window providing a visual indication that the circuit breaker has experienced an overcurrent condition and must be reset. In either the On or the Off position, the red flag is hidden. The flag is coupled to the trip lever via a linkage, which in some configurations comprises a spring. One limitation of the '258 patent is that there is no visual indication in the window to differentiate between the On position or the Off position. To do this, one would have to look at the position of the handle relative to the housing. In other words, the window only provides information relating to whether the circuit breaker is tripped or in a fault state.

One particular actuator configuration is a rocker actuator. A rocker actuator provides a discrete or very low profile on/off actuator. These actuators have many applications including light switches, general power switches, and actuators in circuit breakers. Circuit breakers using a rocker actuator are very suitable for use in power rack configurations in server rooms to feed rack mounted servers where space is at a premium in the environmentally controlled space.

In operation, activation or deactivation of the rocker actuator (On or Off), causes a mechanical movement inside of the housing. When the user activates the actuator, the portion of the actuator (the rocker) that is outside of the housing is moved. The actuator is connected to a pin, which causes a subsequent movement inside of the housing, either completing or disconnecting a circuit (opening or closing the switch).

However, in a rocker actuator design used in connection with a circuit breaker, the physical movement of the actuator is more difficult to visually detect than a standard handle on a circuit breaker. For example, a standard handle extends well outside the housing and is displaced laterally (e.g. typically from side to side) such that it is fairly easy to visually determine the state of the circuit breaker by simply looking at the position of the handle. In a rocker actuator configuration, there is effectively no lateral movement, but rather one side of the switch is displaced inward relative to the housing of the circuit breaker and the other side is displaced upward relative to the housing. However, when looking straight on at the top surface of the circuit breaker housing, it can be difficult to determine the state of the circuit breaker without physically feeling position of the rocker switch or looking at it from an oblique angle, which may not even be possible in server room installations due to space constraints. Additionally, if the rocker actuator does not include a mechanical latching feature such that, when not being physically activated the rocker actuator reverts to a center position, there is no way to determine the status of the circuit breaker visually. It could be that there is no handle position that can provide a status indication.

It is therefore desired to provide an alternative system that is usable with a circuit interrupter that overcomes the aforementioned limitations.

SUMMARY OF THE INVENTION

Accordingly, it is desired to provide a circuit interrupter that provides a visual indication of the status of the circuit breaker.

It is further desired to provide a circuit interrupter that provides a visual indication of whether the circuit breaker is On, or Off, or in a Tripped/Fault state.

It is still further desired to provide a simplified design for a circuit interrupter that utilizes a rocker actuator and provides a visual indication where the visual indication is coupled to the rocker actuator.

These and other objectives are achieved by providing a circuit interrupter, which is movable between an On position, an Off position and a Tripped position. The circuit interrupter (which may comprise a circuit breaker) is provided with a window and includes an indicator that will visually indicate all three circuit interrupter states. In one configuration, for example, the visual indication for "On" will present a Green tag in the window, for "Off" a Black tag will be presented, and for "Tripped" (or Fault) a Red tag will be presented. In this manner, a visual inspection will allow a user to quickly and easily determine the status of the circuit interrupter.

In another configuration, the circuit interrupter may use a rocker actuator as a handle mechanism. This again provides for ease in visually identifying the state of the circuit interrupter even if the interrupter is rack mounted in a server room with limited viewing angles. A visual inspection will allow for the state of the circuit interrupter to quickly and easily be determined without regard for the position of the handle mechanism, which could comprise a rocker actuator.

In another configuration, the tag may be coupled to the rocker actuator without the need for complicated inter linking of moving parts and springs. For example, a window may be positioned adjacent to and aligned with the rotational axis of the rocker actuator. The tag could be provided as a semi-circular piece of material that is coupled to the rocker actuator and, upon movement of the actuator, the semi-circular piece is displaced such that the position of the rocker switch is indicated by the position of the tag presented to the user. If the rocker switch is moved to the On position, the Green portion of the tag could be presented. Alternatively, if the rocker switch is moved to the Off position, the Black portion of the tag could be presented.

In an alternative configuration, a window could be formed of a moveable piece of material that is coupled to the actuator such that when the actuator is moved, semicircular piece having a lens therein rotates about the axis of the actuator and aligns with either the Green portion, the Black portion or the Red portion of a stationary tag provided below so as to indicate the status of the circuit interrupter.

These are just two configurations, however, it is conceived that multiple configurations could effectively be used without deviating from the spirit of the invention of displaying a visual indication on the face of the circuit interrupter for all the operational states of the device.

It should be noted that a window may be aligned with the axis of rotation of the circuit breaker, which allows for a simplified design as the tag or the window can be coupled to the rocker switch so that one or the other may be rotated as the actuator is displaced. In one configuration, the window is provided adjacent to the rocker switch positioned on one side thereof. The window can be provided in the surface of the housing and may comprise, for example, a lens. The tag is provided below the lens and rotates along the axis of the rocker actuator. In another configuration the window is again provided in the housing, however, a semicircular rotating piece including a lens is rotated within the window and the tag is provided as a stationary piece below the rotating piece. In this configuration, the semicircular piece will align the lens with one of the three tag colors depending on the state of the circuit breaker and the other two colors will be blocked from view. In still another configuration, the tag may be provided as a semicircular raised piece on the top of the housing and a shield with an opening can be coupled to the actuator to rotate about the axis of the actuator. As the shield rotates with the actuator, differ portions of the semicircular raised piece can be seen through the opening in the shield corresponding to the state of the circuit interrupter.

This low-profile design with the rocker actuator and visual indication provided within the housing is particularly advantageous for areas where space is at a premium, such as, for example, in a server rack arraignment. The reduction in the size of the circuit breakers allows for more space in the rack thereby allowing for more servers and more potential revenue.

For this application the following terms and definitions shall apply:

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a circuit interrupter is provided comprising a housing, a first contact electrically connectable to a power source and a second contact electrically connectable to a load. The circuit interrupter is provided such that the first and second contacts are movable between a closed and open position relative to each other. The circuit interrupter further comprises a actuator coupled to at least one of the first or said second contacts such that, when the actuator is moved to an off position, the at least one contact moves to the open position, which comprises an off state, and when the actuator is moved to a on position, the at least one contact the closed position, which comprises an on state. The circuit interrupter also includes an overcurrent protection circuit coupled to the at least one contact, wherein when a current through the first and second contacts exceeds a threshold level, the overcurrent protection circuit functions to move the at least one contact to a tripped position, which comprises a fault state. The circuit interrupter finally comprises a status indicator that provides a visual indication of whether the circuit breaker is in each of: the off state, the on state and the fault state.

In another configuration a circuit interrupter is provided comprising a rocker actuator positioned in an upper surface of a housing, the rocker actuator having an axis of rotation and operable to open and close a set of contacts such that, when the rocker actuator is moved to an off position, the contacts are moved to an open position comprising an off state, and when the rocker actuator is moved to an on position, the contacts are moved to a closed position comprising an on state. The circuit interrupter further includes an overcurrent protection circuit coupled to the set of contacts, wherein when a measured current exceeds a threshold level, the overcurrent protection circuit functions to move the contacts to a tripped position comprising a fault state. The circuit interrupter also includes a status indicator providing a visual indication of a status of the circuit interrupter selected from the group consisting of: the off state, the on state and the fault state.

Other objects of the invention and its particular features and advantages will become more apparent from consideration of the following drawings and accompanying detailed description.

BRIEF DESCRIPTION OF THE DRAWINGS

FIG. 7A is an illustration of an alternative configuration for the rocker actuator in the circuit interrupter according to FIG. 5.

FIG. 7B is an enlarged portion of FIG. 7A.

FIG. 7C is an enlarged portion of an alternative configuration for FIG. 7A.

FIG. 8A is an illustration of an alternative configuration for the rocker actuator in the circuit interrupter according to FIG. 6.

FIG. 8B is an enlarged portion of FIG. 8A.

FIG. 8C is an enlarged portion of an alternative configuration for FIG. 8A.

FIG. 11 is an illustration of a portion of the status indicator according to FIGS. 1-3.

FIG. 12 is a top view of the circuit interrupter according to FIGS. 1-3.

DETAILED DESCRIPTION OF THE INVENTION

Figure 1:
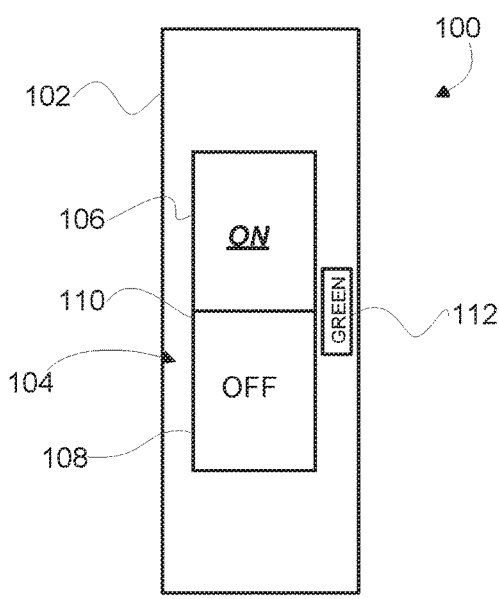
FIG. 1 is a top view of the circuit interrupter illustrating the ON state.

Referring now to the drawings, wherein like reference numerals designate corresponding structure throughout the views.

Figure 2:
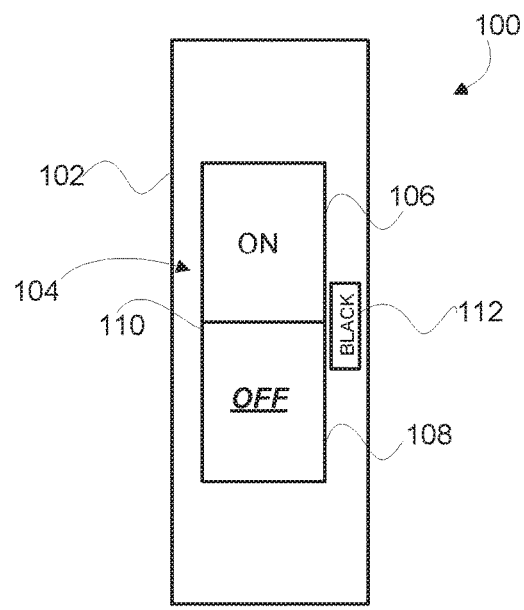
FIG. 2 is a top view of the circuit interrupter illustrating the OFF state.
Figure 3:
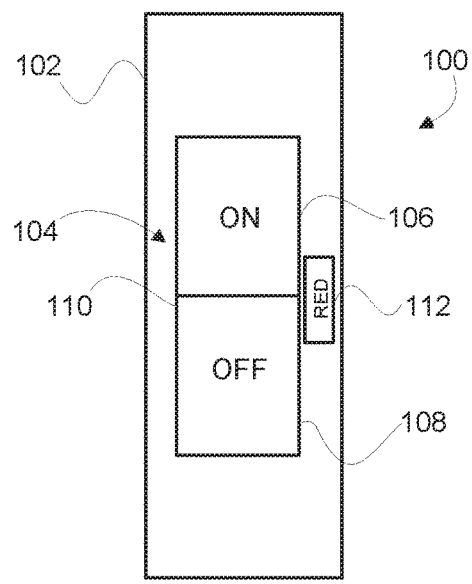
FIG. 3 is a top view of the circuit interrupter illustrating the FAULT state.

FIGS. 1-3 illustrate the circuit interrupter 100, which may comprise a circuit breaker used in a rack mounted configuration, in the On state (FIG. 1) the Off state (FIG. 2) and the Fault state (FIG. 3). In a rack mounted configuration may be used in connection with a plurality of servers positioned in a computer room.

Figure 13:
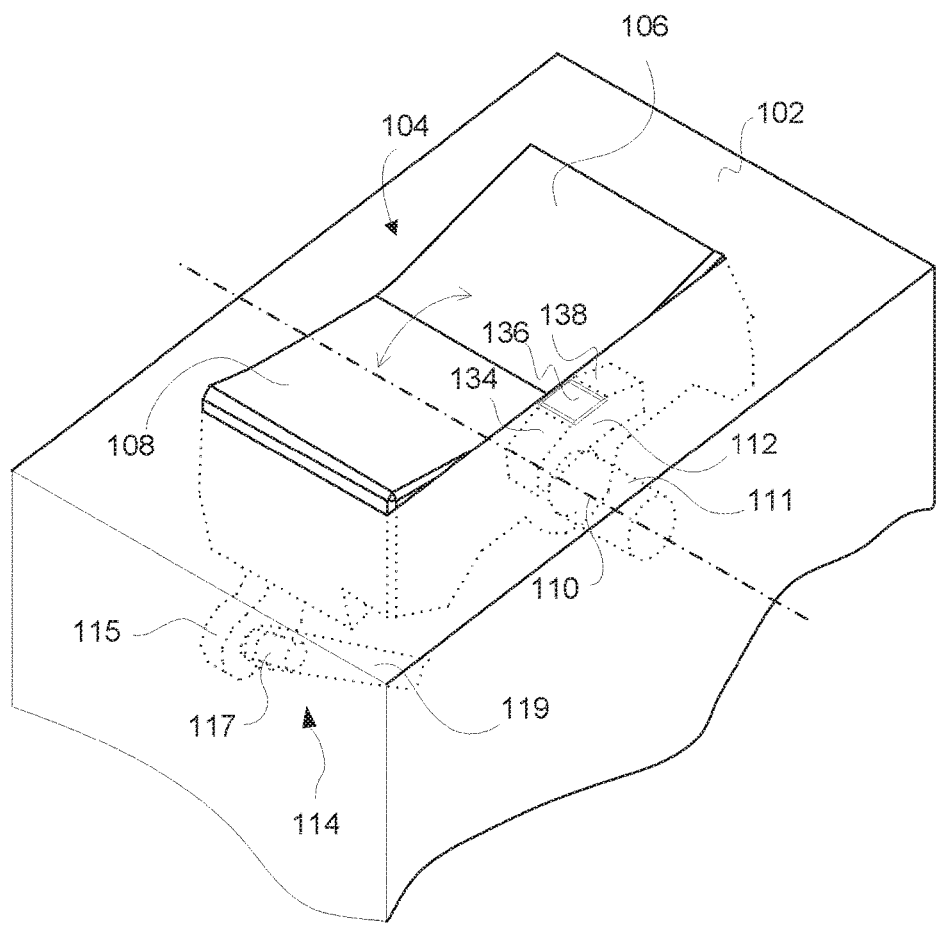
FIG. 13 is a perspective view of the rocker actuator according to FIG. 4

The circuit interrupter 100 includes a housing 102 with a rocker actuator 104 positioned therein. The rocker actuator 104 includes an On portion 106 and an Off portion 108 and is designed to pivot about an axis 110 on a shaft 111 (FIG. 13). The rocker actuator configuration is highly desirable for use in rack mounted applications because of the low profile nature of the actuator construction. However, this low profile nature also means that it is difficult to visually determine the current state of the circuit breaker, especially when, because of a lack of space and limited viewing angles, the circuit breaker may only be viewable directly from the top. Rocker actuators do not provide any visual indication due to lateral switch displacement such as is common with a standard handle configuration. Couple this with the fact that a rocker actuator does not typically provide a large of amount of movement to transition the actuator and it becomes very difficult to determine the status of the circuit breaker from a direct visual inspection. This difficulty is depicted in FIGS. 1-3 where the status of the circuit breaker is not apparent from a top view of the circuit breaker. When these circuit breakers are grouped together on a rack mount configuration and the lighting may not be optimal within the rack itself, it becomes apparent that the status indication on the top surface of the housing would be a very significant aid for a making a quick visual inspection. While the invention is used and described in connection with a rocker actuator configuration, it is contemplated that the invention may further be utilized with actuators other than rocker actuators, such as, handle actuators.

Status indicator 112 is also illustrated in FIGS. 1-3, which in FIG. 1 is indicated as a first color (e.g, "Black") when the circuit interrupter is in the Off state, a second color (e.g., "Green") when the circuit interrupter is in the On state, and a third color (e.g., "Red") when the circuit interrupter is in the Fault state.

Figure 4A:
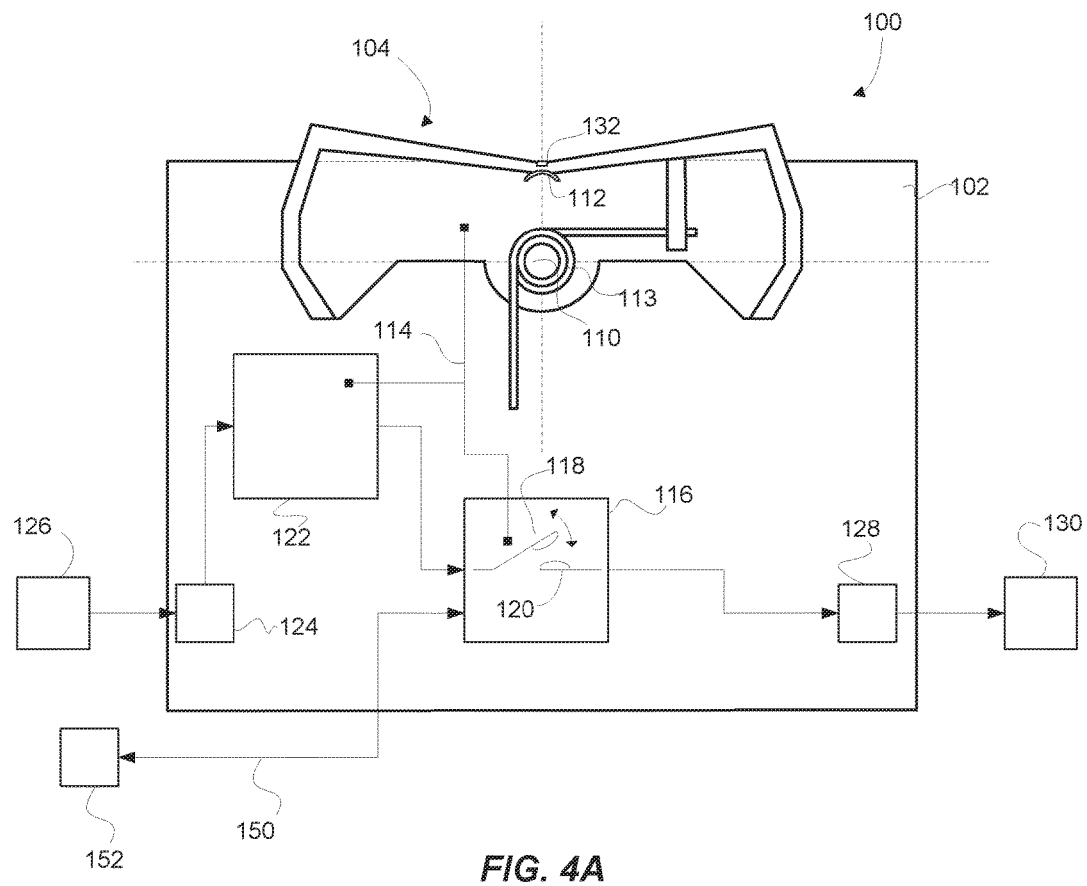
FIG. 4A is an illustration of the rocker actuator used in the circuit interrupter according to FIGS. 1-3.
Figure 4B:
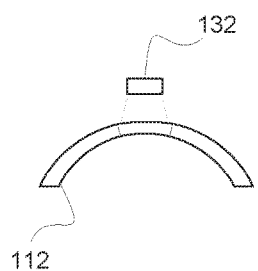
FIG. 4B is an enlarged portion of FIG. 4A.

Turning now to FIGS. 4A and 4B, a configuration for the circuit interrupter 100 is illustrated. In this illustration the rocker actuator 104 is shown extending from the top portion of housing 102.

The rocker actuator 104 is designed to rotate about axis 110 and includes a biasing member 113 that may comprise a spring. A mechanical connection 114 may be coupled to the rocker actuator 104 that includes a protrusion 115 and a pin 117 (FIG. 13). The mechanical connection 114 may comprise a linkage arraignment including one or more elongated elements 119 that function to mechanically connect the rocker actuator 104 to a set of contacts 116 comprising a first contact 118 and a second contact 120. The first contact 118 is electrical coupled to an overcurrent protection circuit 122, which is connected to a line terminal 124 that receives electrical power from a power source 126. The line terminal may comprise any type of terminal known in the art including a screw connection or a stab-type connector (two tines that receive a blade there between) or any other appropriate connector.

The second contact 120 is electrically connected to a load terminal 128, which is then connectable to a load 130 that receives electrical power passing through the circuit interrupter 100. The load terminal would typically comprise a screw type connector that is designed to receive an electrical wire therein and the screw is used to tighten down on the wire inserted into the terminal. However, the load terminal could comprise virtually any type of connection known in the art.

In operation, the overcurrent protection circuit 122 measures the amount of current passing through the circuit interrupter 100 and, if the measured current exceeds a predetermined threshold value, the overcurrent protection circuit 122 is designed to open the set of contacts 116 through the mechanical connection (e.g. actuation of the linkage) 114.

FIG. 4B shows an enlarged portion of FIG. 4A showing the interaction between status indicator 112 and window 132. As can be seen in FIG. 4B the status indictor will be showing the red area indicating the Fault state for the circuit interrupter 100.

Figure 5A:
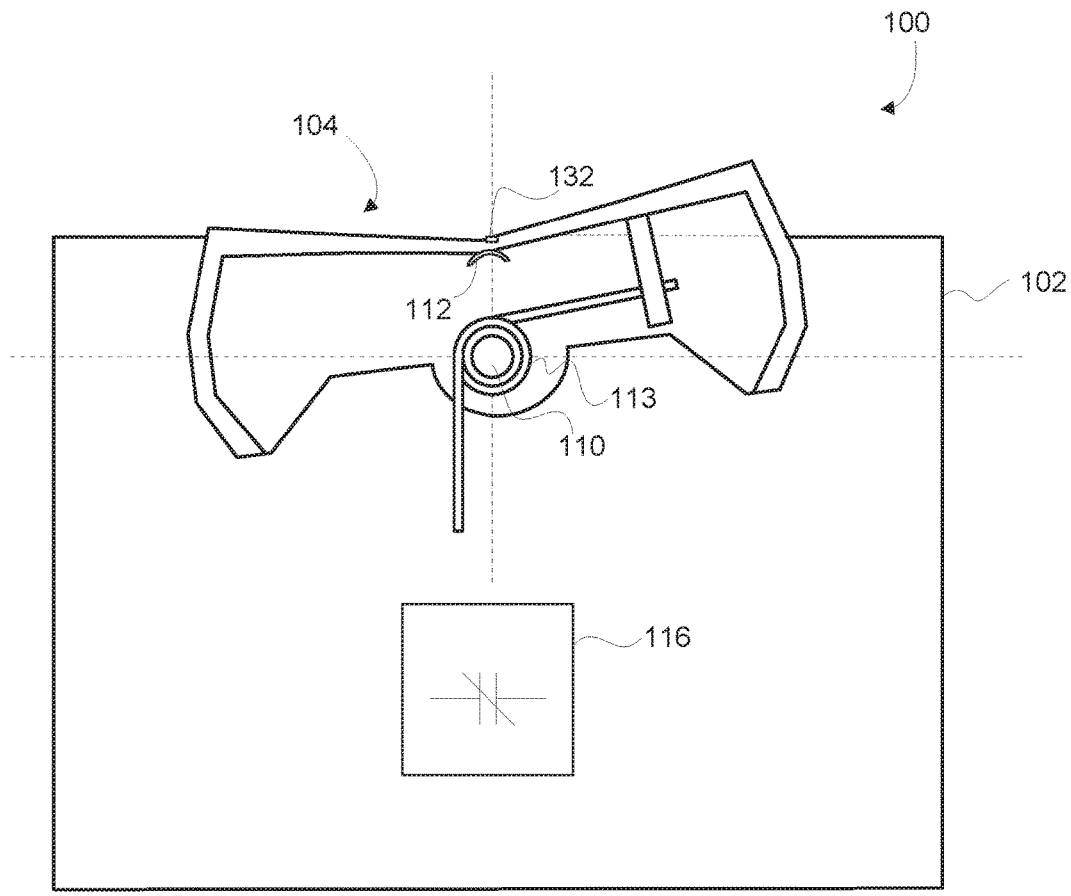
FIG. 5A is an illustration of the rocker actuator in the on state used in the circuit interrupter according to FIGS. 1-3.
Figure 5B:
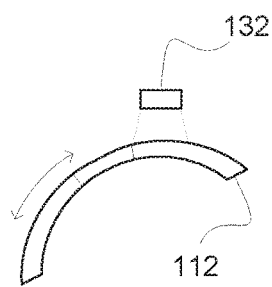
FIG. 5B is an enlarged portion of FIG. 5A.
Figure 6A:
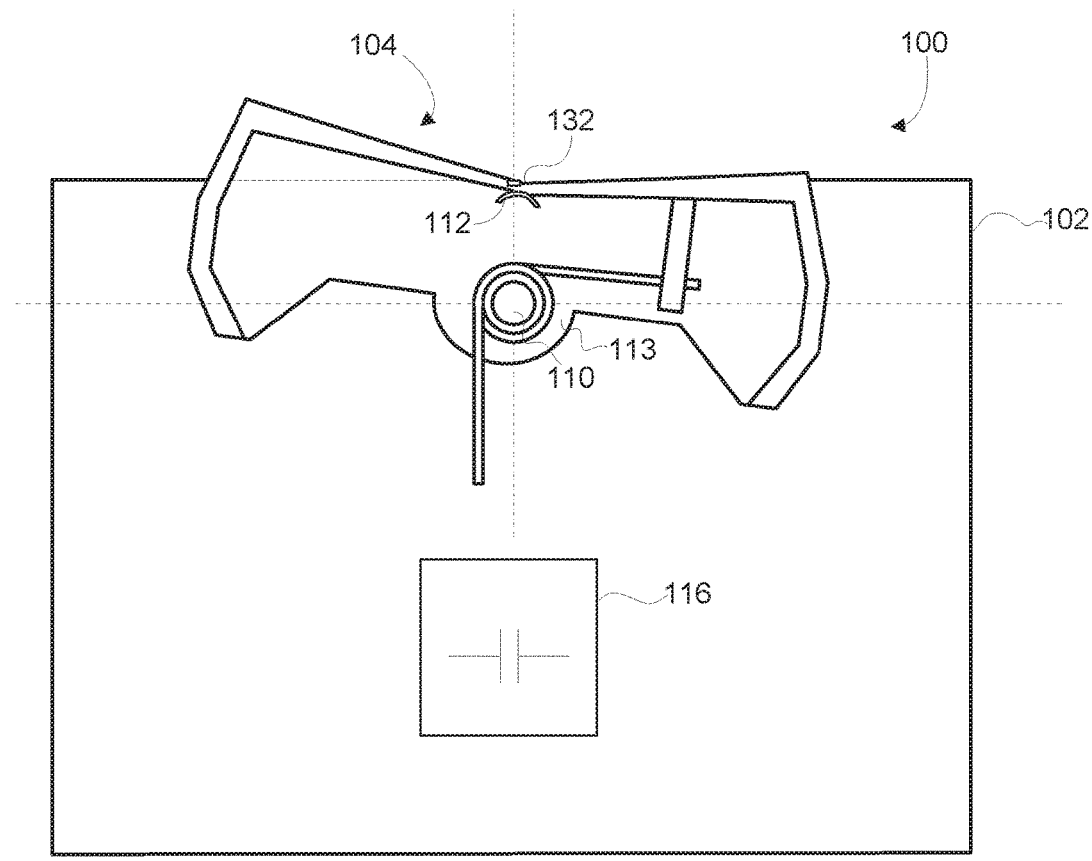
FIG. 6A is an illustration of the rocker actuator in the off state used in the circuit interrupter according to FIGS. 1-3.
Figure 6B:
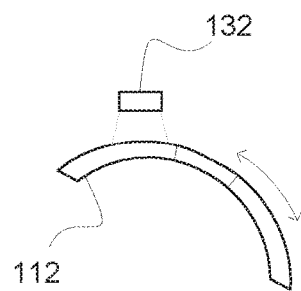
FIG. 6B is an enlarged portion of FIG. 6A.

Alternatively, the set of contacts 116 may be manually opened or closed by physical activation of rocker actuator 104. FIGS. 5 & 6 illustrate the actuator being activated to close (FIGS. 5A & 5B) or open (FIGS. 6A & 6B) the set of contacts. This activation is again achieved by the movement of the mechanical connection (linkage) 114.

Referring to FIGS. 4A-6B, a window 132 is provided in housing 102 through which the status indicator 112 can be seen. The window 132 is stationary and comprises an opening in the top of the housing 102. Turning to FIG. 5 it can be see that as the rocker actuator 104 is depressed and rotates about axis 110, the status indicator also rotates about axis 110 as it is coupled to the rocker actuator 104. In this manner, a different surface area of the status indicator will be depicted in the window as the rocker switch rotates.

FIG. 5B shows an enlarged portion of FIG. 5A showing the interaction between status indicator 112 and window 132. As can be seen in FIG. 5B the status indictor will be showing the green area indicating the On state for the circuit interrupter 100. FIG. 6B shows an enlarged portion of FIG. 6A showing the interaction between status indicator 112 and window 132. As can be seen in FIG. 6B the status indictor will be showing the black area indicating the Off state for the circuit interrupter 100.

FIG. 11 shows an example of the status indicator 112 including three areas 134, 136, 138, which are provided as colored surfaces Green, Red and Black each corresponding to a state of the circuit interrupter 100.

So, for example, in FIG. 5A, the contacts are closed corresponding to the On state as shown in FIG. 1. In this example, the status indicator 112 would have rotated such that the green area 134 would be visible in the window 132. Alternatively, FIG. 6A shows the rocker actuator 100 with the contacts open corresponding to the Off state as shown in FIG. 2. In this example, the status indicator 112 would have rotated such that the black area 138 would be visible in the window 132. FIG. 4A shows the rocker switch 100 with the contacts open corresponding to the Fault state as shown in FIG. 3. In this example, the status indicator 112 would have rotated such that the red area 136 would be visible in the window 132.

Figure 9:
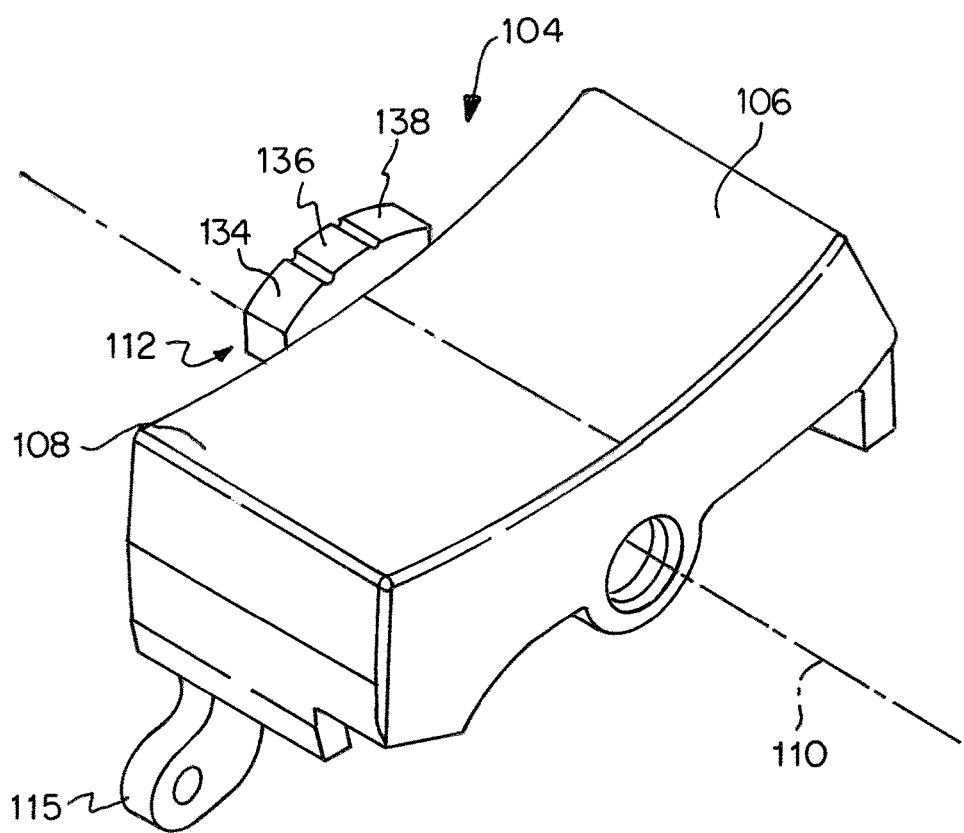
FIG. 9 is top view of the rocker actuator according to FIG. 4.
Figure 10:
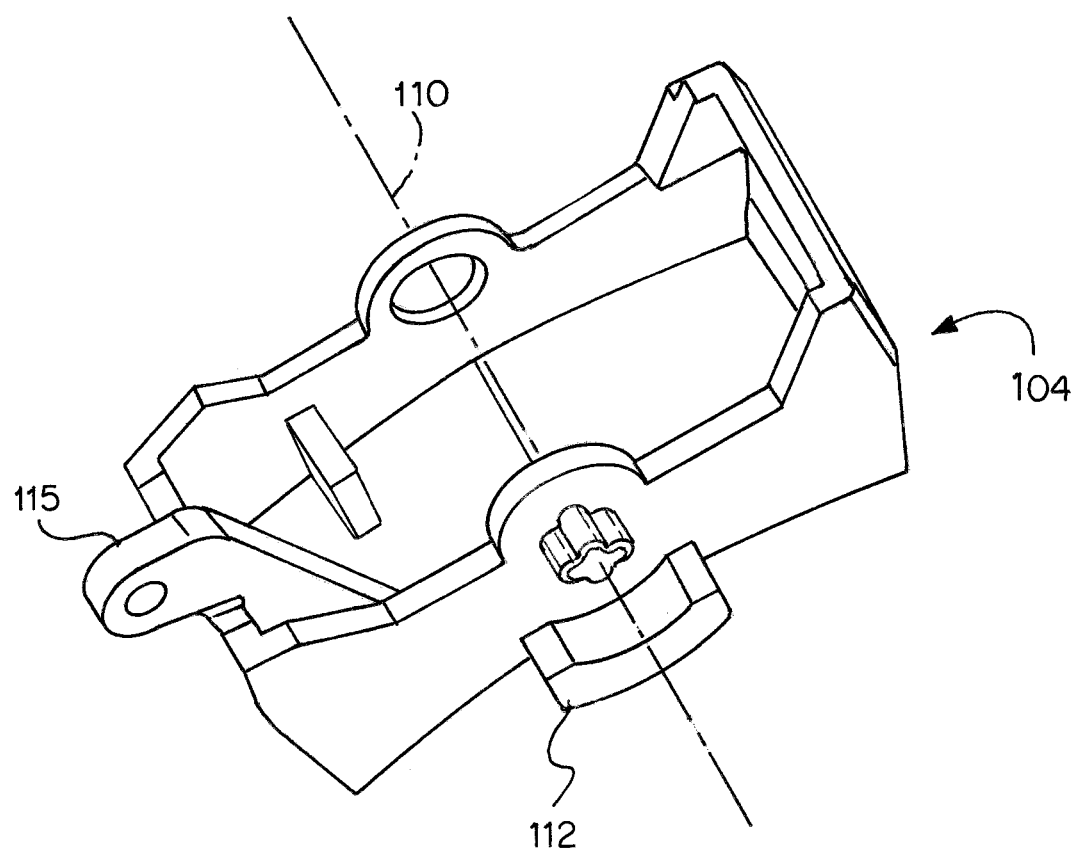
FIG. 10 is bottom view of the rocker actuator according to FIG. 9.

The embodiments of FIGS. 4A-6B include the status indicator directly coupled to the rocker actuator 104, which is further illustrated in FIGS. 9 & 10 showing a top view (FIG. 9) and a bottom view (FIG. 10) of the switch with the status indicator 112 coupled to a side portion thereof. This is a very simple design where the movement of the rocker actuator 104 results in direct rotational movement of the status indicator 112.

Turning now to FIGS. 7A, 7B, 7C, 8A, 8B & 8C, an alternative configuration is illustrated including a shield 140 that is coupled to the rocker actuator 104. This configuration functions similarly to that of FIGS. 4-6 with the exception that the status indicator 112 is stationary and does not rotate with the movement of the rocker actuator 104. Rather, a shield 140 is positioned between the window 132 and the status indicator 112 that rotates around the axis 110 of the rocker switch 104 to selectively reveal the various areas 134, 136, 138 of status indicator based on the state of the circuit interrupter 100.

Turning to FIGS. 7C and 8C, an alternative configuration is provided. For example, the status indicator 112 is built into or, is stationary with respect to the housing 102. In this configuration, the shield 140 is coupled to the rocker actuator 104 and rotates with displacement with the actuator. In FIG. 7C, the green area on status indicator will be seen through the opening indicating that the circuit interrupter is in the On state. Whereas in FIG. 8C, the black area on status indicator will be seen through the opening indicating that the circuit interrupter is in the Off state. This is a simplified design where the status indicator 112 and the shield 140 are essentially maintained on an exterior to the housing 102. For example, the status indicator 112 may be provided a semi-circular or raised portion of the housing and the shield simply rotates about the stationary status indicator 112.

The window 132 may be provided with a transparent lens 150 (FIG. 12) fitted therein so as to prevent object and debris from entering the status indicator 112. The lens 150 may be provided essentially flush with the surface of the housing 102 and may comprise an acrylic lens or any other suitable material.

While the status indicator is illustrated as positioned on one side of the rocker switch 104 it is contemplated that other positions could effectively be utilized where the device utilized the axis of rotation of the rocker switch to provide a simple and effective means to readily identify the state of the circuit breaker even when a low profile rocker type switch configuration is used.

While a mechanical indication is described herein, it is contemplated that an electronic status indication could also effectively be used without departing from the spirit of the invention. For example, it is understood that a visual indication, such as a light, could be activated and viewable in the window in the housing.

In one configuration, the light could comprise an LED such that, if the circuit interrupter is in the On state, a Green LED is illuminated. Alternatively, if the circuit interrupter is in the Off state, no LED would be illuminated (or alternatively, a Yellow or other color LED could be viewable in the window). Finally, if the circuit interrupter is in the Fault state, a Red LED could be illuminated and viewable in the window.

Likewise, it is contemplated that remote monitoring of the status of the circuit interrupter 100 could be done. For example, the On, Off or Fault state of the circuit interrupter could be transmitted via a network connection 150 to a remote monitoring station 152 that could comprise a computer (FIG. 4). Likewise, the circuit interrupter could be provided such that it could be remotely turned to the On or Off position, or could be remotely reset from the Fault position.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A circuit interrupter comprising:
   a housing;
   a first contact electrically connectable to a power source;
   a second contact electrically connectable to a load;
   said first and second contacts being movable between a closed and open position relative to each other;
   a handle coupled to at least one of said first or said second contacts such that, when said handle is moved to an off position, the at least one contact moves to the open position, which comprises an off state, and when said handle is moved to an on position, the at least one contact the closed position, which comprises an on state;
   an overcurrent protection circuit coupled to the at least one contact;
   wherein when a current through the first and second contacts exceeds a threshold level, said overcurrent protection circuit functions to move the at least one contact to a tripped position, which comprises a fault state;
   a status indicator that provides a visual indication of whether the circuit breaker is in each of: the off state, the on state and the fault state; and
   wherein said handle has an axis of rotation, and said status indicator comprises a rotational element that rotates about the axis of rotation of said handle.

2. The circuit interrupter of claim 1, wherein said handle comprises a rocker actuator.

3. The circuit interrupter of claim 2, wherein said status indicator includes a status surface having three areas each corresponding to one of: the off state, the on state and the fault state.

4. The circuit interrupter of claim 3, wherein the area of the off state comprises a first color, the area of the on state comprises a second color and the area of the fault state comprises a third color, wherein the first, second and third colors are different from each other.

5. The circuit interrupter of claim 3, further comprising a window in said housing, wherein said rotational element comprises a protrusion coupled to the rocker actuator, the protrusion including the status surface thereon such that, as the protrusion rotates with said rocker actuator, only one of the areas is visible through said window.

6. The circuit interrupter of claim 5, further comprising a lens positioned in said window.

7. A circuit interrupter comprising:
   a housing;
   a first contact electrically connectable to a power source;
   a second contact electrically connectable to a load;
   said first and second contacts being movable between a closed and open position relative to each other;
   a handle coupled to at least one of said first or said second contacts such that, when said handle is moved to an off position, the at least one contact moves to the open position, which comprises an off state, and when said handle is moved to a on position, the at least one contact the closed position, which comprises an on state;
   an overcurrent protection circuit coupled to the at least one contact;
   wherein when a current through the first and second contacts exceeds a threshold level, said overcurrent protection circuit functions to move the at least one contact to a tripped position, which comprises a fault state;
   a status indicator that provides a visual indication of whether the circuit breaker is in each of: the off state, the on state and the fault state;
   wherein said handle comprises a rocker actuator having an axis of rotation, and said status indicator comprises a rotational element that rotates about the axis of rotation of said rocker actuator;
   wherein said status indicator includes a status surface having three areas each corresponding to one of: the off state, the on state and the fault state; and
   wherein the rotational element comprises a shield with an opening therein coupled to the rocker actuator such that said shield rotates about the axis of the rocker actuator and simultaneously covers two of the three areas such that only one of the areas is visible through said opening.

8. The circuit interrupter of claim 7, further comprising a window in said housing and said status indicator is visible through said window, wherein said rotational element is positioned within said housing between said status indicator and said window.

9. The circuit interrupter of claim 8, further comprising a lens positioned in said window.

10. A circuit interrupter comprising:
    a rocker actuator positioned in an upper surface of a housing, said rocker actuator having an axis of rotation and operable to open and close a set of contacts such that, when said rocker actuator is moved to an off position, the contacts are moved to an open position comprising an off state, and when said rocker actuator is moved to an on position, the contacts are moved to a closed position comprising an on state;
    an overcurrent protection circuit coupled to the set of contacts;
    wherein when a measured current exceeds a threshold level, said overcurrent protection circuit functions to move the contacts to a tripped position comprising a fault state; and
    a status indicator providing a visual indication of a status of the circuit interrupter selected from the group consisting of: the off state, the on state and the fault state, wherein said status indicator comprises a rotational element that rotates about the axis of rotation of said rocker actuator.

11. The circuit interrupter of claim 10, wherein said status indicator includes a status surface having three areas each corresponding to one of: the off state, the on state and the fault state.

12. The circuit interrupter of claim 11, wherein the area of the off state comprises a first color, the area of the on state comprises a second color and the area of the fault state comprises a third color, wherein the first, second and third colors are different from each other.

13. The circuit interrupter of claim 11, further comprising a window in said housing, wherein said rotational element comprises a protrusion coupled to the rocker actuator, the protrusion including the status surface thereon such that, as the protrusion rotates with said rocker actuator, only one of the areas is visible through said window.

14. The circuit interrupter of claim 13, further comprising a lens positioned in said window.

15. A circuit interrupter comprising:
- a rocker actuator positioned in an upper surface of a housing, said rocker actuator having an axis of rotation and operable to open and close a set of contacts such that, when said rocker actuator is moved to an off position, the contacts are moved to an open position comprising an off state, and when said rocker actuator is moved to an on position, the contacts are moved to a closed position comprising an on state;
- an overcurrent protection circuit coupled to the set of contacts;
- wherein when a measured current exceeds a threshold level, said overcurrent protection circuit functions to move the contacts to a tripped position comprising a fault state;
- a status indicator providing a visual indication of a status of the circuit interrupter selected from the group consisting of: the off state, the on state and the fault state;
- wherein said status indicator comprises a rotational element that rotates about the axis of rotation of said rocker actuator;
- wherein said status indicator includes a status surface having three areas each corresponding to one of: the off state, the on state and the fault state; and
- wherein the rotational element comprises a shield with an opening therein coupled to the rocker actuator such that said shield rotates about the axis of the rocker actuator and simultaneously covers two of the three areas such that only one of the areas is visible through said opening.

16. The circuit interrupter of claim 15, further comprising a window in said housing and said status indicator is visible through said window, wherein said rotational element is positioned within said housing between said status indicator and said window.

17. The circuit interrupter of claim 16, further comprising a lens positioned in said window.

* * * * *